United States Patent [19]

Kearney

[11] Patent Number: 4,678,586

[45] Date of Patent: Jul. 7, 1987

[54] TREATMENT OF WASH WATER IN PAINT SPRAY BOOTHS

[76] Inventor: Thomas J. Kearney, 7 Oaklands, Green La, Malvern Wells, Worcester WR14 4JE, England

[21] Appl. No.: 784,881

[22] PCT Filed: Jan. 31, 1985

[86] PCT No.: PCT/GB85/00048

§ 371 Date: Oct. 2, 1985

§ 102(e) Date: Oct. 2, 1985

[87] PCT Pub. No.: WO85/03459

PCT Pub. Date: Aug. 15, 1985

[30] Foreign Application Priority Data

Feb. 7, 1984 [GB] United Kingdom ............... 8403246

[51] Int. Cl.$^4$ .............................................. C02F 1/66
[52] U.S. Cl. ...................................... 210/743; 55/19; 55/85; 210/752; 210/764; 422/3; 422/13
[58] Field of Search ................ 55/19, 84, 85; 134/38; 210/702, 709, 712, 724, 739, 743, 749, 764, 96.1, 139, 140, 752; 422/13, 3; 427/311

[56] References Cited

U.S. PATENT DOCUMENTS 4,550,011 10/1985 McCollum .......................... 210/140

FOREIGN PATENT DOCUMENTS 51-96163 8/1976 Japan ................................... 210/716
53-37063 10/1978 Japan ................................... 210/743

Primary Examiner—Peter Hruskoci
Attorney, Agent, or Firm—Kinney & Lange

[57] ABSTRACT

To control build-up of paint in the water tank an alkaline liquid containing NaOH is added in quantities to maintain a pH not substantially less than 9, thus preventing corrosion, and a hydroxide ion concentration not exceeding 0.01M. The additive is introduced by a metering pump under the control of a programmed timer over a seven day cycle. Over half the amount to be added in the cycle is introduced as a single discrete dose (preferably before a weekend) and the rest as smaller doses at intervals.

7 Claims, No Drawings

TREATMENT OF WASH WATER IN PAINT SPRAY BOOTHS

The present invention relates to the treatment of wash water in paint spray booths by the addition of an alkaline solution to the water.

In paint spray booths it is common practice to use a water curtain falling over the back wall of the booth and to collect sprayed paint which is not deposited on the article to be painted by means of wash water. Air is in some cases extracted from the booth through the water curtain and/or through water sprays and the waste paint is usually accumulated in a water tank situated below the wash section.

The paint tends to coagulate and form a thick layer floating on the surface of the water. To facilitate breakdown of the paint and eventual separation of the paint from the wash water it is known to use chemical additives in the wash water. Specialized additives have been developed for treating particular types of paint but a common type of additives is alkaline and contains a high percentage of sodium hydroxide. Such additives are corrosive and hazardous to handle, especially if used in powder form, requiring the use of protective clothing and proper ventilation. Operators of paint spray booths do not, in general, have much experience of handling hazardous chemicals and cannot be expected to exercise continuous control over the handling of the additive and the rate at which it is added to the water. Small operators at present use powder additives which are tipped into the water from time to time in a very erratic and wasteful manner.

Larger operators use liquid additives and attempt to exercise some control over their introduction. Automatic dosing is at present impractical in most cases because of the high cost and technical complexity of the equipment. In particular attempts to measure the pH of the water in the tank continuously by means of a probe positioned in the water have been unsuccessful because the probe is rapidly coated with paint and becomes inaccurate.

The suggested use of a pH probe to control the introduction of additive is in any case based on an incorrect view of the requirements and it is this, in addition to the difficulties outlined above, which has prevented the introduction of a more satisfactory method of treatment. Firstly it has been thought that best results would be obtained by maintaining the same condition of the water at all times, at least while handling a particular type of paint. Apart from the fact that this is more difficult to achieve because it requires continuous monitoring and control of the introduction of small quantities of additive, it has now been established that stable uniform conditions encourage the growth of anaerobic bacteria in the tank. Secondly it has been thought that the amount of additives required would be proportional to the amount of paint to be treated and this has often led to over-use of the additive, which may have the effect of making conditions worse rather than better.

In accordance with the present invention there is provided a method of treating wash water in paint spray booths by addition of an alkaline solution to the water characterised in that the addition is effected according to a predetermined program in successive treatment cycles each lasting for a number of days, the amount added in each cycle being sufficient to maintain the water at a pH value not substantially below 9 while the concentration of hydroxide ion in the water does not exceed 0.01M, and in each treatment cycle over half the amount to be added is introduced as a single discrete dose and the remainder in smaller doses at intervals.

In this method the pH value is chosen to minimize corrosion of the metal tank by the wash water. There is no direct control of the amount of alkaline solution added. All that is necessary is to check the pH with a test paper from time to time and adjust the amount added in the course of a treatment cycle if the pH value falls too low. The required quantity of alkali in the water is very much lower than that resulting from most conventional methods of treatment. While there is not direct control of the addition of alkaline solution in accordance with the concentration in the bath, the amount added over a treatment cycle is adjusted to maintain the appropriate concentration and thus is a function of water loss from the bath rather than of the quantity of paint being treated.

The method of addition of discrete doses including one relatively large dose results in sudden changes in conditions in the bath which, without substantially affecting the behaviour of the paint, discourage the growth of bacteria. In a typical plant which operates for five days a week and is shut down on Saturday and Sunday, the treatment cycle is of seven days and the major dose of solution is added during or at the end of work on Friday to discourage bacterial growth over the weekend, which is usually a period of stable and undisturbed conditions ideal for such growth.

This method of addition also lends itself to automatic control by the use of a programmed timer to control a metering pump. The program can easily be adjusted by the operator to give the best results in the conditions of use of his particular booth, for example when the type of paint is changed. For some types of paint, for example, it is found that higher pH values are acceptable, whereas these may be unsatisfactory for other types of paint. Adjustment of the program allows most variations in paint type to be handled successfully without the need to change to a specialized additive for each different paint type.

Control of bacteria can be increased by the use of a bactericide but this should again be added in discrete quantities rather than continuously. A convenient arrangement is to add the bactericide to each container of the alkaline solution in such a way that the mjor portion of bactericide is fed to the tank after the alkaline solution has been used up. This ensures occasional major addition of bactericide at intervals proportional to the rate of usage of the alkaline solution.

The apparatus used for addition of alkaline solution to the used water in a booth can conveniently include a peristaltic pump. This has the following advantages:
  (a) simple construction with no contact between the liquid and the operating mechanism of the pump,
  (b) self-priming with immediate and secure cut-off,
  (c) high vacuum and pressure heads suitable for operations at a remote position.

In a preferred embodiment the pump used is the Watson-Marlow 101 FS/R pump which has a rotating pump head on which are mounted two rollers carried at the ends of spring-loaded arms. When operating on 50 Hz supply at a maximum speed of 20 rpm and with tubing of the maximum internal diameter of 4.8 mm this is capable of a delivery rate of 32.6 ml/min.

Control of the pump is effected by a seven-day solid-state programmable timer. The preferred timer is the AMF Paragon EC 71 Electronic Time Control. This has a digital indicator showing either the current day and time or the day and time being programmed or reviewed. A keyboard provides simple processing of the required programs. A mode switch has positions for time-setting, auto-operation, program, and test and there is a manual over-ride enabling the operator to actuate the pump at times not provided for in the programme.

The timer and the pump are conveniently mounted in a control box which can be fitted to the side wall of the booth close to the back and above the water tank. A plastic tube leads from the pump into the side of the booth just above the maximum water level and below the top of the water tank. The supply of alkaline solution is contained in a 25 liter drum which is placed beside the booth and connected by a length of plastic tube to the input side of the pump.

Spray booths used in Britain generally have water tanks which are of a standard height and a standard dimension from back to front. Their width varies and is commonly 5, 10, 15 or 20 ft. (approx. 1.5, 3, 4.5 and 6 m). The volume of water is 200, 400, 600 or 800 gallons (909, 1818, 2727, and 3636 liters). The preferred additive is an aqueous solution containing caustic soda in an amount of 0.075 kg per liter. It may also contain small quantities of paint denaturants to improve its performance. For each size of tank programs are recommended using minimum and maximum quantities of additive. For example for the smallest tank, containing 909 liters of water, a program cycle of minimum quantity operates the pump for 8 mins on Monday, 19 mins. on Tuesday, 18 mins. on Wednesday, 16 mins. on Thursday and 1 hr. 32 mins. on Friday, with no further additions until the following Monday. At an actual delivery rate of 26 ml./min. this corresponds to a total addition over the week of approximately 0.3 kg of caustic soda, of which the major part, 0.18 Kg, is added on Friday. The corresponding program for maximum additions to a small tank operates the pump for 13 mins on Monday, 24 mins on Tuesday, 22 mins. on Wednesday, 19 mins. on Thursday, and 2 hrs. 32 mins. on Friday. This corresponds to an addition of a total of approximately 0.47 Kg of caustic soda in a week of which 0.32 Kg is added on Friday.

Each of the program is for regular week by week treatment. The times for which the pump is operated may be set at values within the range between minimum and maximum to obtain optimum performance having regard to the nature and quantity of paint being sprayed. When starting with a tank of fresh water it is of course necessary to start with a substantial addition of alkaline solution, of an amount comparable with or greater than that added on a Friday. This may be done by use of the pump or by a manual bulk addition of liquid or solid additive.

For larger tanks the quantity of additive required has been determined empirically. It does not increase in direct proportion to the volume of water in the tank. For example the recommended program for minimum additions to a tank containing 1818 liters, twice the smallest size, is the same as that for maximum additions to the smallest tank. The program for maximum additions to a 1818 liter (400 gallon) tank operates the pump for a total of 305 mins. per week compared with 230 mins. per week for the maximum addition to a 909 liter (200 gallon) tank.

The addition of 0.47 Kg of caustic soda to a tank containing 909 liters would give a concentration of about 0.52 gm/liter or a 0.013 molar solution. Since however the addition is spread over a week during which paint is being treated and water is being removed from and added to the tank the concentration of sodium hydroxide and thus of hydroxide ion does not exceed 0.01M.

To achieve occasional addition of bactericide to the tank an oil-based bactericide is included in each drum of alkaline solution. The bactericide floats on the surface of the aqueous solution. The liquid pumped to the water tank is drawn from the bottom of the drum so that the bactericide is pumped into the tank when the alkaline solution has been drawn off and the drum is nearly empty.

I claim:

1. In a method of treating wash water in a paint spray booth by addition of an alkaline solution including sodium hydroxide to the water for facilitating breakdown of the paint and eventual separation of the paint from the wash water, the improvement which comprises automatically controlling the amount and timing of the addition of alkaline solution to the water according to a predetermined program which includes the steps of establishing with a programmed timer successive water treatment cycles, each cycle lasting for a plurality of days, automatically adding an amount of alkaline solution to the water with a metering pump controlled by said timer during each cycle sufficient to maintain the pH value of the water at a level which minimizes corrosion of metal components of the paint spray booth by the water while the concentration of hydroxide ion in the water does not exceed 0.01M, and introducing, during each treatment cycle, a single discrete dose of alkaline solution that is over half the amount of alkaline solution to be added in that cycle to the water, with the remainder of the alkaline solution to be added in that cycle to the water being introduced at spaced intervals during that cycle.

2. The improved method of claim 1 wherein each treatment cycle is of seven days duration with the single discrete dose being introduced on one day during the cycle and the remainder of the alkaline solution being introduced in doses on other days during the cycle.

3. The improved method of claim 2 wherein the single discrete dose is introduced at the end of a period of use of the paint spray booth for painting and no further doses are added during those days of the cycle when the booth is not in use for painting.

4. The improved method of claim 2 wherein each treatment cycle includes a period of at least one day when the paint spray booth is not in use for painting, with no alklaine solution being added to the wash water during that period.

5. The improved method of claim 1 wherein a bactericide is added to the wash water in a single amount not more than once in two treatment cycles.

6. The improved method of claim 1 wherein the pH value of the water is maintained at approximately 9.

7. The improved method of claim 4 wherein the single discrete dose of alkaline solution is introduced to the wash water on the day preceding the period when the paint spray booth is not in use.

* * * * *